US010969671B2

(12) United States Patent
Yamagishi et al.

(10) Patent No.: US 10,969,671 B2
(45) Date of Patent: Apr. 6, 2021

(54) LIGHTING DEVICE AND PROJECTION DISPLAY APPARATUS

(71) Applicant: Panasonic Intellectual Property Management Co., Ltd., Osaka (JP)

(72) Inventors: Shigekazu Yamagishi, Osaka (JP); Yusaku Nishikawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/699,302

(22) Filed: Nov. 29, 2019

(65) Prior Publication Data

US 2020/0096851 A1 Mar. 26, 2020

Related U.S. Application Data

(62) Division of application No. 16/168,714, filed on Oct. 23, 2018.

(51) Int. Cl.
| | |
|---|---|
| *G03B 21/20* | (2006.01) |
| *F21K 9/64* | (2016.01) |
| *H04N 9/31* | (2006.01) |
| *G03B 33/12* | (2006.01) |
| *F21V 29/70* | (2015.01) |
| *F21V 7/30* | (2018.01) |

(52) U.S. Cl.
CPC .............. *G03B 21/204* (2013.01); *F21K 9/64* (2016.08); *F21V 7/30* (2018.02); *F21V 29/70* (2015.01); *G03B 21/2013* (2013.01); *G03B 33/12* (2013.01); *H04N 9/3161* (2013.01); *H04N 9/3164* (2013.01)

(58) Field of Classification Search
CPC .. G03B 21/204; G03B 21/2013; G03B 33/12; F21K 9/64; H04N 9/3161; H04N 9/3164
See application file for complete search history.

(56) References Cited

U.S. PATENT DOCUMENTS

| | | | |
|---|---|---|---|
| 2014/0254133 A1* | 9/2014 | Kotter | H04N 9/3111 362/84 |
| 2015/0098065 A1 | 4/2015 | Tanaka | |

FOREIGN PATENT DOCUMENTS

| | | |
|---|---|---|
| JP | 2012-129135 | 7/2012 |
| JP | 2013-102078 | 5/2013 |
| JP | 2015-034896 | 2/2015 |

* cited by examiner

*Primary Examiner* — Michael E Teitelbaum
(74) *Attorney, Agent, or Firm* — Wenderoth, Lind & Ponack, L.L.P.

(57) ABSTRACT

A lighting device of the present disclosure includes an excitation light source, a phosphor, a spreader, a reflective layer, and a reflective region. The excitation light source emits a polarized light. The phosphor receives the light as an excitation light from the excitation light source, and emits a fluorescent light, the phosphor including a plurality of phosphor pieces adjacently disposed on the reflective layer, the plurality of phosphor pieces having a same characteristic. The spreader supports the phosphor. The reflective layer is disposed between the phosphor and the spreader, and reflects the fluorescent light. The reflective region is disposed between the plurality of phosphor pieces, the reflective region reflecting the received excitation light while keeping a polarization characteristic of the received excitation light.

17 Claims, 9 Drawing Sheets

LIGHTING DEVICE AND PROJECTION DISPLAY APPARATUS

BACKGROUND

1. Field of the Invention

The present disclosure relates to a lighting device using a phosphor, and a projection display apparatus using the lighting device as a light source.

2. Description of the Related Art

Patent Literature 1 (Unexamined Japanese Patent Publication No. 2012-129135) discloses that the directivity of light emission is controlled by blocking the gaps between divided phosphors with light absorbing materials. When the light emission intensity estimated for illumination or the like is used, however, the light absorbing materials generate a remarkably large amount of heat. This method is not practical in consideration of the temperature quenching characteristic of phosphors. Patent Literature 2 (Unexamined Japanese Patent Publication No. 2013-102078) discloses a technology in which a more effective wall is disposed on the interface between phosphors and this wall is used as a metal reflective face. Also in this technology, the interface between adjacent phosphors has a specific property. Furthermore, metals having different thermal expansions are disposed on the interface, so that the reliability is reduced.

In either technology, different materials are disposed between phosphors and the excitation light entering the materials is wasted. Therefore, the efficiency is obviously reduced.

SUMMARY

The present disclosure provides a lighting device that can generate, with a simple configuration, a combined color from the color light of excitation light and the fluorescent light. Furthermore, by dividing a phosphor into a plurality of phosphor pieces, this lighting device can achieve a high reliability at which a delamination fracture does not occur even when the phosphor has received strong excitation energy.

A lighting device of the present disclosure includes an excitation light source, a phosphor, a spreader, a reflective layer, and a reflective region. The excitation light source emits a polarized light. The phosphor receives the light as an excitation light from the excitation light source, and emits a fluorescent light, the phosphor including a plurality of phosphor pieces adjacently disposed on the reflective layer, the plurality of phosphor pieces having a same characteristic. The spreader supports the phosphor. The reflective layer is disposed between the phosphor and the spreader, and reflects the fluorescent light. The reflective region is disposed between the plurality of phosphor pieces, the reflective region reflecting the received excitation light while keeping a polarization characteristic of the received excitation light.

In a lighting device of the present disclosure, a combined color (for example, white color) can be generated from the color light of excitation light and the fluorescent light in a simple configuration. Furthermore, by dividing a phosphor into a plurality of phosphor pieces, a high reliability at which a delamination fracture does not occur even when the phosphor has received strong excitation energy can be achieved.

DETAILED DESCRIPTION OF THE PREFERRED EMBODIMENTS

Hereinafter, exemplary embodiments are described in detail appropriately with reference to the accompanying drawings. Here, unnecessarily detailed descriptions are sometimes omitted. For example, the detailed descriptions of well-known items or the redundant descriptions of substantially the same configuration are sometimes omitted. The objective of the omission is to avoid unnecessary redundancy of the following descriptions and to allow persons skilled in the art to easily understand the present disclosure.

The accompanying drawings and the following descriptions are provided to allow the persons skilled in the art to sufficiently understand the present disclosure. The drawings and descriptions are not intended to restrict the subjects described in the claims.

Exemplary Embodiment

Hereinafter, an exemplary embodiment of a phosphor light-source lighting device is described with reference to FIG. 1 to FIG. 9.

Figure 1:
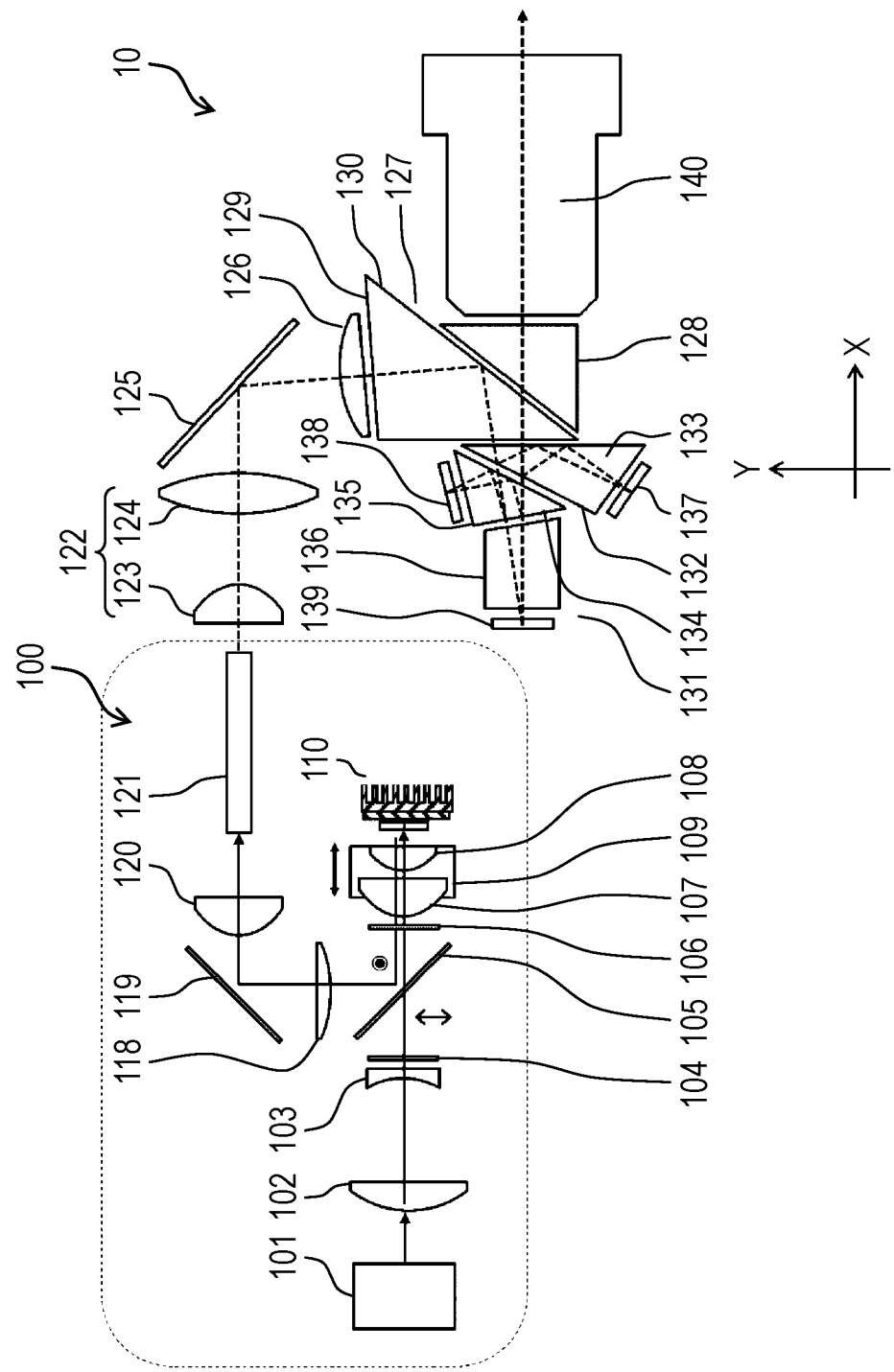
FIG. 1 is a diagram showing a projection display apparatus using a phosphor light-source lighting device in accordance with an exemplary embodiment.
Figure 2:
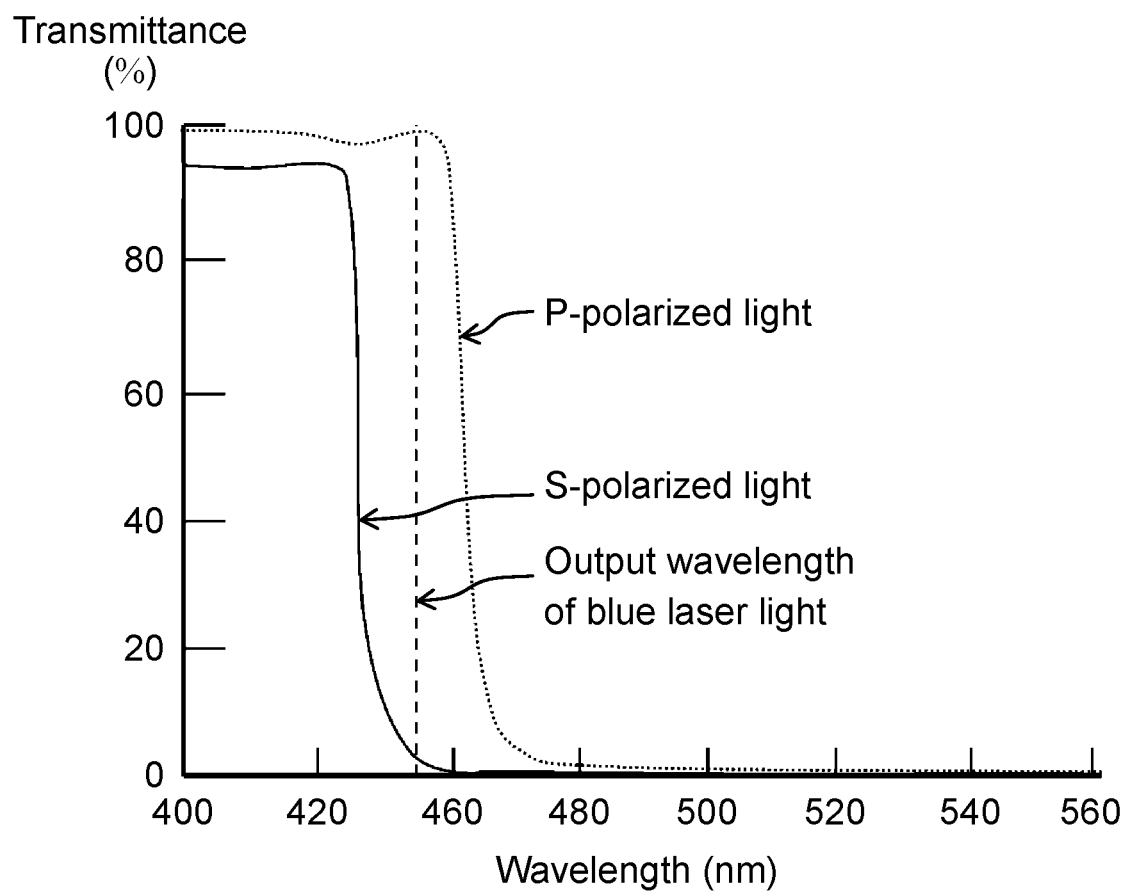
FIG. 2 is a diagram showing the spectral characteristic of a dichroic mirror.
Figure 3:
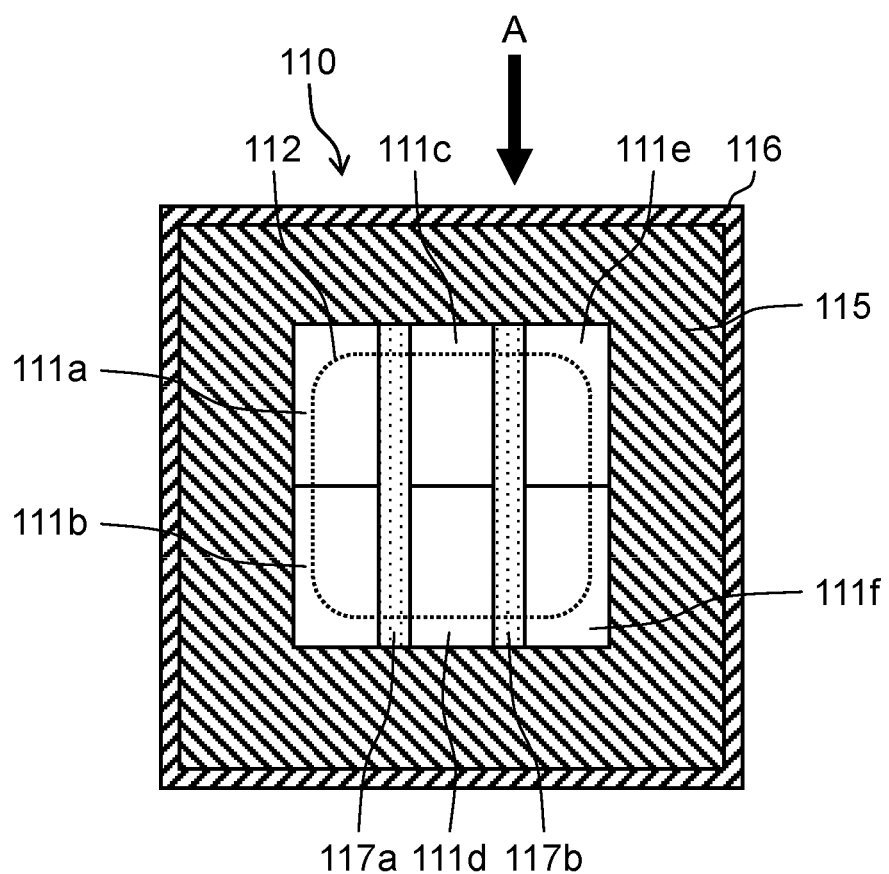
FIG. 3 is a front view of a phosphor device used for the phosphor light-source lighting device.
Figure 4:
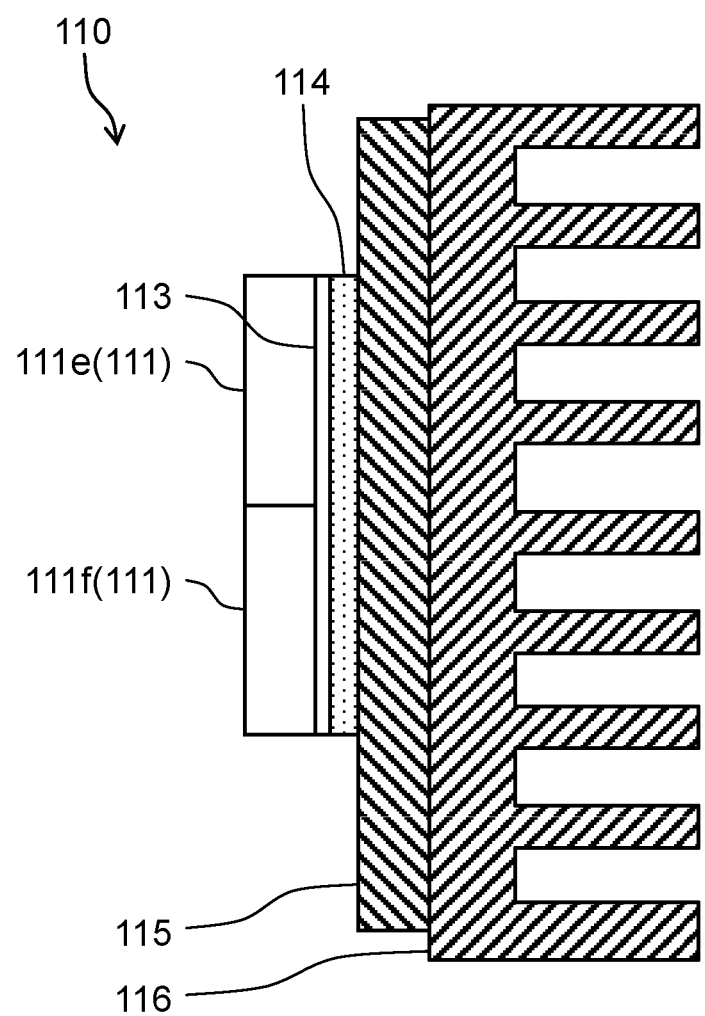
FIG. 4 is a side view of the phosphor device shown in FIG. 3.
Figure 5:
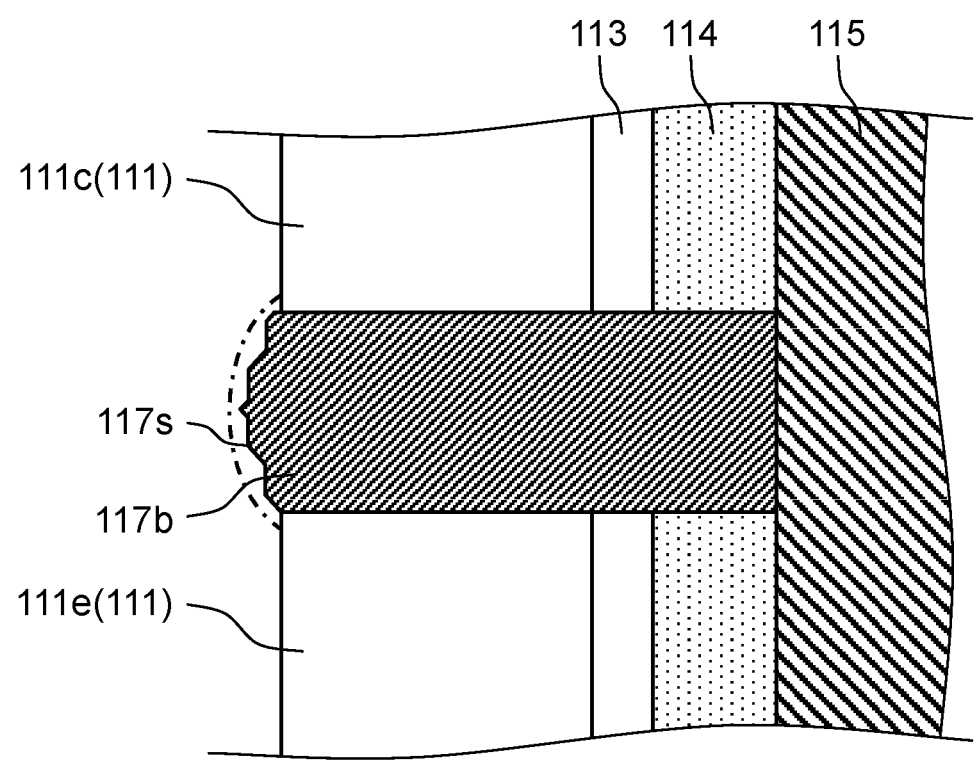
FIG. 5 is a diagram showing a configuration of a reflective region of the phosphor device.
Figure 6:
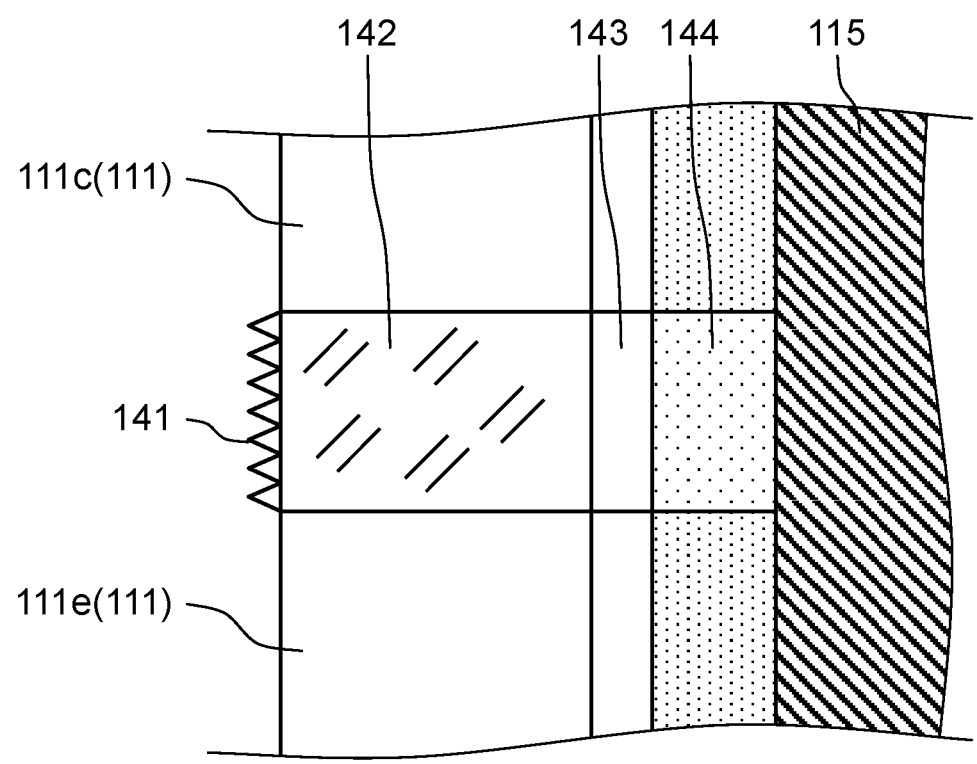
FIG. 6 is a diagram showing modified example 1 of the reflective region of the phosphor device.
Figure 7:
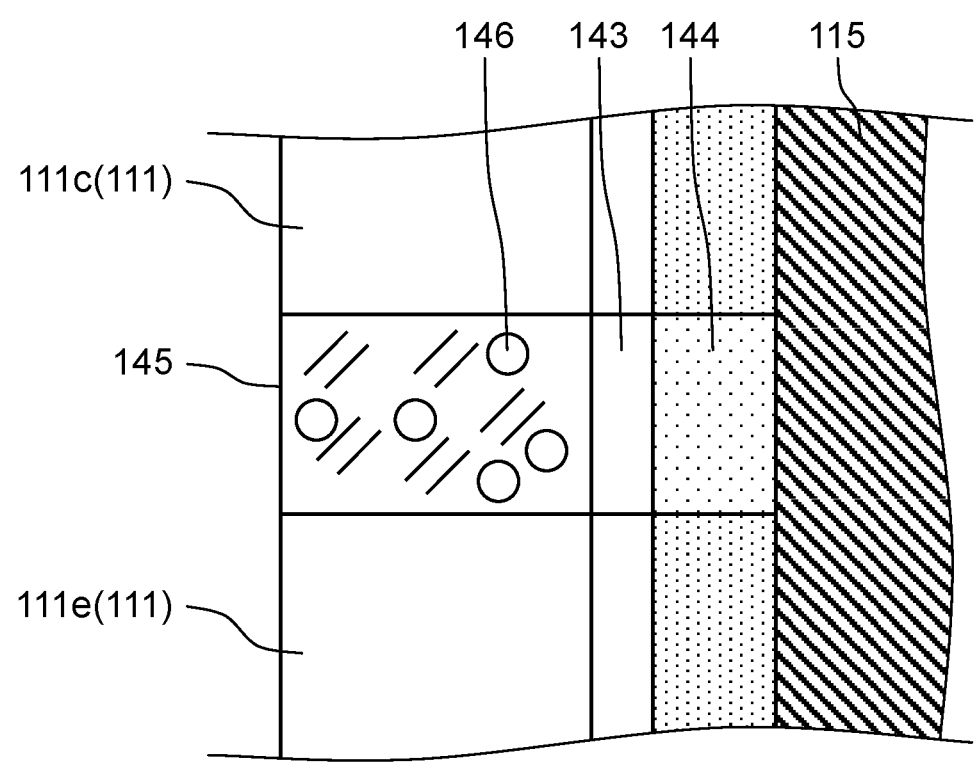
FIG. 7 is a diagram showing modified example 2 of the reflective region of the phosphor device.
Figure 8:
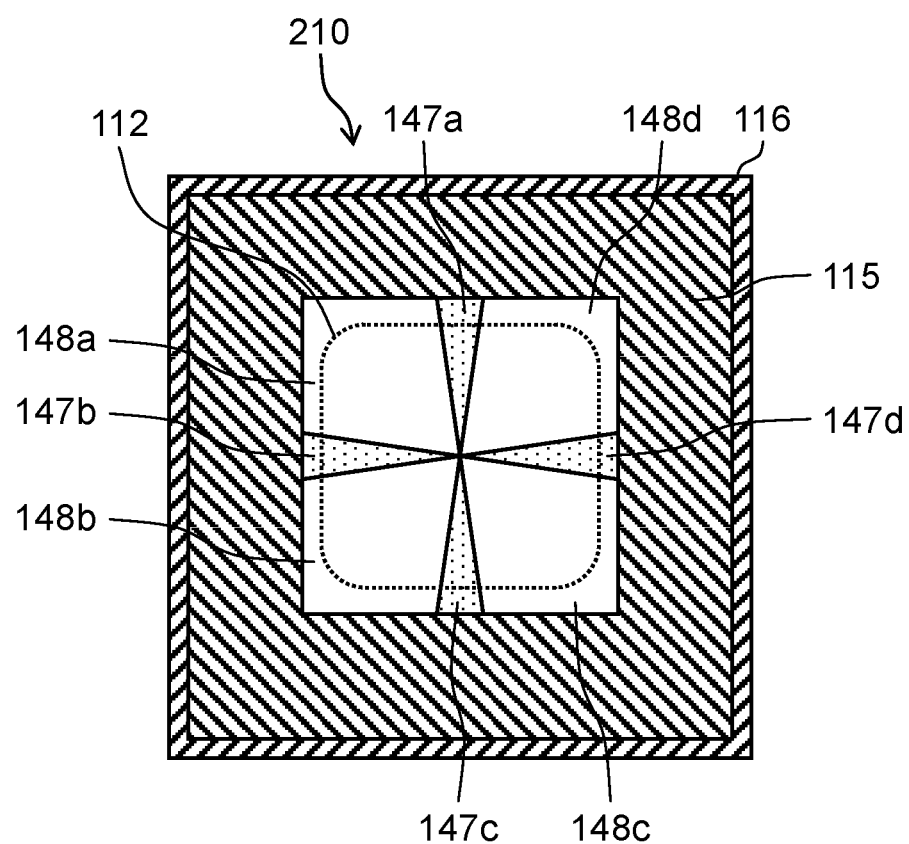
FIG. 8 is a front view showing the phosphor device in accordance with modified example 3.
Figure 9:
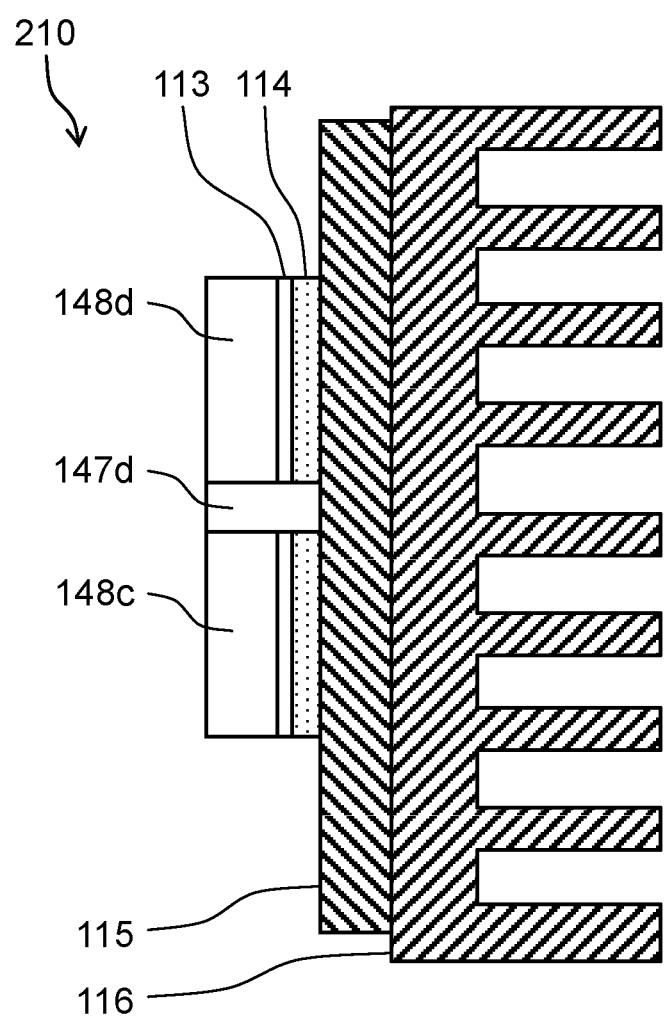
FIG. 9 is a side view of the phosphor device shown in FIG. 8.

FIG. 1 is a diagram showing the configuration of a projection display apparatus using the phosphor light-source lighting device. FIG. 2 is a spectral characteristic diagram of a dichroic mirror. FIG. 3 is a front view of a phosphor device used for the phosphor light-source lighting device. FIG. 4 is a side view of the phosphor device shown in FIG. 3. FIG. 5 is a partially enlarged view of an A arrow part of the phosphor device of FIG. 3. FIG. 6 and FIG. 7 are partially enlarged views showing the configurations of the reflective regions of the phosphor devices in accordance with modified examples 1 and 2, respectively. FIG. 8 is a front view of the phosphor device in accordance with modified example 3. FIG. 9 is a side view of the phosphor device of FIG. 8. Here, the hatching in the drawings of FIG. 3 to FIG. 9 allows the configuration to be understood, and does not show cross sections.

In FIG. 1, blue laser diode unit 101 for light sources includes: a plurality of blue laser diodes; and collimating lenses disposed on the outgoing side of the blue laser diode unit correspondingly to respective blue laser diodes. Blue laser diode unit 101 can output light while suppressing the spread of laser beams. Light coming from blue laser diode unit 101 is radiated in the +X direction, is converted into a substantially telecentric light (collimated light) by lens 102 and lens 103, and enters diffuser 104. In other words, lens 102 and lens 103 constitute an afocal optical system. Diffuser 104 includes an endless number of fine protrusions on its surface, and can control the outgoing angle of the incident light after the diffuser panel between the Y-direction and the direction perpendicular to the paper plane in FIG. 1. The light having entered diffuser 104 travels in the +X direction while keeping the polarization characteristic, and enters dichroic mirror 105 inclined with respect to the principal beam of the incident light.

Dichroic mirror 105 has a spectral characteristic shown in FIG. 2. Incidentally, the light outgoing from blue laser diode unit 101 is polarized (namely, polarized light). In the present exemplary embodiment, the outgoing light is configured to enter dichroic mirror 105 as P-polarized light. The perpendicular broken line in FIG. 2 shows 455 nm, which is the center wavelength of the light outgoing from blue laser diode unit 101. Blue laser diode unit 101 is an example of the excitation light source.

Thus, the incident light to dichroic mirror 105 passes through it, and then enters λ/4 plate 106, which is a quarter wavelength plate. Here, λ/4 plate 106 is set so that a linearly-polarized incident light perpendicularly enters it. The phase axis of λ/4 plate 106 is set so as to satisfy the following condition:
 the light entering λ/4 plate 106 is linearly polarized; but
 the light having passed through λ/4 plate 106 is circularly polarized.

Generally, the phase axis with respect to the polarization axis of the incident light is set at 45°. In this case, however, λ/4 plate 106 is supported so that, around this angle, the angle of the phase axis can be adjusted with respect to the polarization axis of the incident light.

The light having passed through λ/4 plate 106 enters condenser lenses 107 and 108, and then is collected onto a phosphor of phosphor device 110 to form a spot pattern. Condenser lenses 107 and 108 are integrally stored in barrel 109, and are movable on the optical axis together with barrel 109. Thus, the distance from the condenser lenses to the phosphor of phosphor device 110 can be adjusted. Therefore, the excitation light collected onto the phosphor is within the range (light collection range 112) shown by the broken line in FIG. 3. Light collection range 112 is determined on the basis of: the spread angle of the light coming from blue laser diode unit 101; the light flux diameter; the specification of diffuser 104; and the distance from the condenser lenses 107 and 108 to the phosphor. Here, as shown in FIG. 3, the phosphor includes six phosphor pieces 111a, 111b, 111c, 111d, 111e, and 111f. In some cases, a plurality of phosphor pieces are collectively called phosphor 111.

In phosphor device 110, as shown in FIG. 3 and FIG. 4, phosphor 111 (phosphor pieces 111a, 111b, 111c, 111d, 111e, and 111f) and reflective layer 113 disposed on the back side thereof are fixed to spreader 115 via light-transmitting adhesive layer 114. Here, spreader 115 is made of a material having a high thermal conductivity, such as copper. In the present exemplary embodiment, heat sink 116 as a heat dissipating means is integrally formed. Spreader 115 is generally called a heat spreader.

Phosphor 111 receives light as the excitation light from blue laser diode unit 101, and emits fluorescent light. Phosphor 111 is formed of a ceramic plate made of an inorganic material. Reflective layer 113 disposed between phosphor 111 and spreader 115 has a property of reflecting the light of a fluorescent wavelength at which phosphor 111 emits light.

Phosphor 111 utilizes about half of the incident light as the excitation light for wavelength conversion, and about half of the remaining incident light becomes heat. When the temperature excessively increases, a phenomenon that is called temperature quenching and decreases the conversion efficiency occurs. Therefore, in order to prevent the reduction in output and the increase in generated heat, an appropriate heat dissipation is required. Therefore, reflective layer 113 is produced as a very thin layer by vapor deposition or the like, and the influence on the thermal conductivity is set small. Adhesive layer 114 is preferably made of a material having a high thermal conductivity, and its thickness is set also small (for example, 20μ or less). When the phosphor is formed integrally and the excitation energy is high, there is the following risk:
 the phosphor breaks due to the difference between the amount of thermal expansion generated by increase in phosphor temperature and the amount of thermal expansion of fixed spreader 115.

Because the absolute amount of the thermal expansion is small, however, this risk can be suppressed by forming a slight gap between each of the phosphor pieces and a different material disposed among them. Here, the gap is originally required for assembling. This phenomenon is remarkable especially when the phosphor is made of ceramic.

As shown in FIG. 3, and as shown in FIG. 5 showing a part of the A arrow view of FIG. 3, reflective regions 117a and 117b are disposed among phosphor pieces 111a, 111b, 111c, 111d, 111e, and 111f. As shown in FIG. 5, each of the reflective regions disposed on spreader 115 as a substrate is configured so as to satisfy the following conditions:
 the surface (reflective surface 117s) of the reflective region has a zigzag shape or an uneven shape; and
 the incident light is regularly reflected with a certain diffusion width kept.

Reflective surface 117s of the reflective region is formed on a projecting reference sphere used for enlarging and reflecting the light coming from the front side. Here, the reference sphere is the dashed-dotted line shown in FIG. 5, and is an example of a reference surface. Thus, the light is regularly reflected with a spread kept. Thus, the incident blue light arrives at the reference sphere through λ/4 plate 106 in the state of circularly polarized light, but becomes a circularly polarized light of reverse rotation after reflection by reflective surface 117s. That is because the polarization characteristic is kept even when the circularly polarized light is reflected by reflective surface 117s. Then, the circularly polarized light of reverse rotation returns to condenser lenses 107 and 108 with a certain spread angle kept.

Reflective regions 117a and 117b occupy a surface area of about 20% of light collection range 112. As discussed above, it is preferable that the surface area percentage of reflective regions 117a and 117b does not significantly change even when variation in components related to light collection range 112 somewhat changes the magnification or position. Specifically, the following configurations are not preferable:
 the surface area percentage rapidly changes at a center part or in a peripheral part; and
 the surface area significantly changes in a boundary part in design of light collection range 112.

Phosphor 111 has a property of receiving blue light (excitation light) and emitting yellow light. The ratio between the quantity of the yellow light emitted in the phosphor region and that of the blue light reflected in the reflective regions is determined mainly by the area ratio between the following factors:

the phosphor surface of phosphor 111 into which the excitation light comes; and the total reflective surface of reflective regions 117a and 117b.

Therefore, when the area ratio changes significantly, the white quality of the white light cannot be kept.

It is preferable that, in light collection range 112 on the light collection surface of the excitation light, the design center is defined so that the area ratio of the reflective surface of the reflective region to the phosphor surface is 10-20 to 100. When the percentage of the phosphor surface decreases, the brightness is affected, the surface state and polarization characteristic of the reflective region vary—not zero—, and the influence on the amount of loss of the blue light becomes significant. Therefore, the area percentage of the reflective surface is set at 20 or less. Furthermore, it is desirable that, when the light collection spot size (light collection range 112) varies at an area change rate of ±20% or less due to optical variation, the following condition is satisfied:

the change rate of the area ratio between the reflective surface of the reflective region and the phosphor surface is a half or less of the area change rate (for example, 25% when the ratio between the reflective region and the phosphor surface is 20:100).

Here, the light collection spot size means an effective range of the excitation light that is formed on the reflective surface and phosphor surface.

In the example shown in FIG. 3, reflective region 117a is disposed between phosphor piece 111a and phosphor piece 111c. However, a reflective region may be formed between phosphor piece 111a and phosphor piece 111b.

Thus, the blue light having been reflected by the reflective surface of reflective regions 117a and 117b comes into λ/4 plate 106 again as a circularly polarized light of reverse rotation, and passes through it. After that, this circularly polarized light becomes S-polarized light orthogonal to the polarization direction at the incident time, and enters dichroic mirror 105. As shown in FIG. 2, the S-polarized blue light of a center wavelength of 455 nm,—the same as that of the P-polarized blue light—, is reflected by dichroic mirror 105 and hence travels in the +Y-direction. The blue light passes through lens 118, mirror 119, and lens 120, and is collected to the incident surface of rod integrator 121 having a rectangular opening.

Upon receiving the blue light as the excitation light, a phosphor 111 part in light collection range 112 emits an yellow fluorescent light. In the present exemplary embodiment, as the phosphor, a YAG phosphor that has a relatively high conversion efficiency and achieves widespread use in a light source market is employed. The generated yellow light returns to condenser lenses 107 and 108 again similarly to the blue light. The fluorescent light that has passed through the condenser lenses enters λ/4 plate 106, and then enters dichroic mirror 105 without being affected by the polarization characteristic in λ/4 plate 106. That is because the polarization characteristic of the fluorescent light is eliminated. Dichroic mirror 105 has a property of reflecting the light of 440 nm or more regardless of the polarization characteristic as shown in FIG. 2. Therefore, similarly to the blue light, the incident yellow light passes through lens 118, mirror 119, and lens 120, and is collected to the incident surface of rod integrator 121 having the rectangular opening.

The light outgoing from rod integrator 121 enters relay optical system 122, passes through relay lenses 123 and 124, is reflected by return mirror 125, passes through field lens 126, and then enters total internal reflection prism 127. Total internal reflection prism 127 is formed by fixing first prism 128 to second prism 129 while keeping a slight gap. The light having entered total internal reflection prism 127 is totally reflected by total reflection surface 130, and then enters color prism unit 131.

Color prism unit 131 is formed by bonding and fixing the following prisms to each other:

first prism 133 including dichroic mirror surface 132 having a property of reflecting blue light;

second prism 135 including dichroic mirror surface 134 having a property of reflecting red light; and third prism 136.

End surfaces of respective prisms include digital micromirror devices (DMDs) 137, 138, and 139 as shown in FIG. 1. In these DMDs, very small mirrors are disposed two-dimensionally, and the falling direction is controlled in two directions in response to an image signal from the outside. At the falling angle during the ON signal, the reflected light having been reflected by a very small mirror returns to color prism unit 131 at an incident angle of 0°. During the OFF signal, the reflected light enters color prism unit 131 again at a wide angle. DMD 137 is used for blue light modulation, DMD 138 is used for red light modulation, and DMD 139 is used for green light modulation. Each DMD is an example of an image display element that modulates the light outgoing from the lighting device in response to the image signal and generates image light.

Thus, in the pixel of each of DMDs 137, 138, and 139, color display can be achieved in the following processes:

the image light corresponding to the white display mode (ON signal) returns to color prism unit 131 again;

the image light passes through first prism 128 and second prism 129 of total internal reflection prism 127, and then enters projection lens 140; and the image light arrives at a screen (not shown).

In such configuration, phosphor light-source lighting device 100 can process yellow light and blue light on the same optical path with one block, so that a simple and small system can be achieved. In the present exemplary embodiment, phosphor light-source lighting device 100 is used in projection display apparatus 10, and a DMD is used as the image display element. However, the present disclosure is not limited to this. The image display element can be replaced with liquid crystal or the like as long as it can modulate the incident light.

Phosphor light-source lighting device 100 of the present exemplary embodiment is an example of a lighting device. Not an image display element but a lens group for enlarging and lighting a forward image is disposed on the outgoing side, and the lens group can be naturally developed as a lighting apparatus. The phosphor light-source lighting device of the present disclosure is available as a lighting device as long as the phosphor light-source lighting device is formed of an excitation light source, a phosphor device, and a minimum required optical system disposed between them. Therefore, rod integrator 121 is not essential, for example.

In the present exemplary embodiment, reflective regions 117a and 117b having zigzag shapes or uneven shapes are disposed, on a substrate, among phosphor pieces 111a, 111b, 111c, 111d, 111e, and 111f. However, any configuration can be employed as long as the incident light is reflected without affecting the polarization characteristic. In other words, the same effect can be produced even when the reference sphere of reflective surface 117*s* shown in FIG. 5 has not a projecting shape but a recessed shape. Thus, a fine uneven portion is disposed on this reference sphere.

As shown in modified example 1 of FIG. 6, a reflective region may be formed by fixing transparent member 142 (a part of light-transmitting member) to spreader 115 via adhesive layer 144. Here, transparent member 142 includes: diffusing means 141 having a light-transmitting characteristic on its reflective surface; and reflective layer 143 on the surface facing the reflective surface. Here, naturally, the reference sphere can be disposed on the reflective surface side, the reflective layer 143 side, or both of them.

As shown in modified example 2 of FIG. 7, a reflective region may be formed by mixing beads 146 having different refractive indices into transparent material 145 to provide a diffusing function. Also in this case, transparent material 145 is fixed to spreader 115 via refractive layer 143 using adhesive layer 144. When the diffusivity becomes high in accordance with a set amount of beads or set refractive indices, however, the polarization characteristic is difficult to be kept and the available light quantity decreases. Therefore, the diffusivity must be suppressed to a level allowing the polarization characteristic to be kept.

FIG. 8 is a front view of the phosphor device 210 in accordance with modified example 3. In FIG. 8, the shapes of the refractive surfaces of reflective regions 147*a*, 147*b*, 147*c*, and 147*d* and the shapes of the phosphor surfaces of phosphor pieces 148*a*, 148*b*, 148*c*, and 148*d* are changed. This case is desirable because the change in the area ratio between the refractive surfaces and phosphor surfaces due to the change of the light collection spot size (light collection range 112) can be suppressed. FIG. 9 is a side view of phosphor device 210 shown in FIG. 8. In this case, each refractive surface is formed by producing the surface of spreader 115 using a partially uneven material or by producing the surface of spreader 115 in a saw-tooth-like zigzag shape.

In this case, the reflective region may be produced in the following methods:

as shown in modified example 1 of FIG. 6, an uneven portion is disposed on the front surface of a light-transmitting member, and a reflective layer is disposed on the back surface; and as shown in modified example 2 of FIG. 7, beads having different refractive indices are mixed into a light-transmitting material to provide a diffusing function, and a reflective layer is disposed on the back surface.

In the present exemplary embodiment, a phosphor is made of an inorganic phosphor, especially ceramic, and is bonded to a spreader via an adhesive layer. However, some inorganic phosphors capable of being produced directly on the spreader, or organic phosphors or the like capable of being mixed with the binder and being directly applied to the spreader do not require an adhesive layer. Therefore, only a reflective layer may be formed between the phosphor and the spreader.

In the present exemplary embodiment, in phosphor devices 110 and 210, phosphor 111 and reflective layer 113 disposed on the back surface thereof are fixed to spreader 115 via adhesive layer 114 and integrated with heat sink 116. Here, spreader 115 is made of a material (copper material) such as copper having a high thermal conductivity. However, phosphor 111 and reflective layer 113 are not limited to these. As a reflective layer, a phosphor may be fixed to a spreader via a light-transmitting adhesive material including a reflective material. Furthermore, the following method is also allowed: a reflective layer is disposed between the phosphor and the spreader without an adhesive layer, and the phosphor is fixed to a spreader via a reflective layer by diffusion bonding. Thus, heat dissipation can be performed efficiently without heat resistance in the adhesive layer. This configuration can be applied to the reflective regions shown in FIG. 6 and FIG. 7.

The present exemplary embodiment has shown an example in which a copper material is used as spreader 115. It is desirable that first and second essential factors as the spreader are a high thermal conductivity and a low thermal expansion coefficient, respectively. Therefore, when the excitation energy is low, the cost can be reduced using an aluminum material, especially using a pure aluminum material. While, when the excitation energy is high, the problem can be addressed by producing the spreader using ceramic such as silicon carbide having both a high thermal conductivity and a low thermal expansion coefficient. Thus, the spreader is fixed in the projection display apparatus differently from a phosphor wheel, and includes a cooling means inside the spreader or on a surface of the spreader being where a portion provided with the phosphor is excluded. In the present exemplary embodiment, heat sink 116 is used as a cooling means. However, naturally, it can be changed to another means such as a liquid cooling means.

Furthermore, a configuration using a YAG phosphor having a high conversion efficiency in a visible region has been described. This configuration is applicable to a lighting device that obtains output light by finally mixing the light having the wavelength of excitation light and the light having the wavelength of the fluorescent light, or to a projection display apparatus.

INDUSTRIAL APPLICABILITY

The present disclosure is applicable to a lighting device using a phosphor, or a projection display apparatus.

What is claimed is:

1. A lighting device comprising:
   an excitation light source configured to emit a polarized light;
   a phosphor configured to receive the polarized light as an excitation light from the excitation light source, and emit a fluorescent light, the phosphor including a plurality of phosphor pieces configured to emit the fluorescent light having a same wavelength;
   a spreader configured to support the phosphor;
   a reflective layer disposed between the phosphor and the spreader, and configured to reflect the fluorescent light, wherein the plurality of phosphor pieces are adjacently disposed on the reflective layer; and
   a reflective region disposed between the plurality of phosphor pieces, the reflective region reflecting the received excitation light while keeping a polarization characteristic of the received excitation light, wherein the reflective region includes:
   a light-transmitting member; and
   a reflective portion disposed between the light-transmitting member and the spreader.

2. The lighting device according to claim 1, wherein a reflective surface of the reflective region configured to receive the excitation light has an uneven shape.

3. A lighting device comprising:
   an excitation light source configured to emit a polarized light;
   a phosphor configured to receive the polarized light as an excitation light from the excitation light source, and emit a fluorescent light, the phosphor including a plurality of phosphor pieces configured to emit the fluorescent light having a same wavelength;

a spreader configured to support the phosphor;

a reflective layer disposed between the phosphor and the spreader, and configured to reflect the fluorescent light, wherein the plurality of phosphor pieces are adjacently disposed on the reflective layer; and a reflective region disposed between the plurality of phosphor pieces, the reflective region reflecting the received excitation light while keeping a polarization characteristic of the received excitation light, wherein a reflective surface of the reflective region configured to receive the excitation light has a fine uneven portion on a projecting or recessed reference surface.

4. A lighting device comprising:

an excitation light source configured to emit a polarized light;

a phosphor configured to receive the polarized light as an excitation light from the excitation light source, and emit a fluorescent light, the phosphor including a plurality of phosphor pieces configured to emit the fluorescent light having a same wavelength;

a spreader configured to support the phosphor;

a reflective layer disposed between the phosphor and the spreader, and configured to reflect the fluorescent light, wherein the plurality of phosphor pieces are adjacently disposed on the reflective layer; and a reflective region disposed between the plurality of phosphor pieces, the reflective region reflecting the received excitation light while keeping a polarization characteristic of the received excitation light, wherein the reflective region includes a reflective surface configured to receive the excitation light, the plurality of phosphor pieces include phosphor surfaces configured to receive the excitation light, and an area ratio of the reflective surface to the phosphor surfaces is 10-20 to 100.

5. The lighting device according to claim 1, wherein the reflective region includes a reflective surface configured to receive the excitation light, the plurality of phosphor pieces include phosphor surfaces configured to receive the excitation light, and when an area change rate of an effective range of the excitation light received by the phosphor is 20% or less, a change rate of an area ratio of the reflective surface to the phosphor surfaces in the effective range is a half or less of the area change rate.

6. The lighting device according to claim 1, wherein the reflective region is in direct contact with the spreader, the reflective layer, and the plurality of phosphor pieces.

7. The lighting device according to claim 1, wherein a surface roughness of the reflective region is larger than a surface roughness of the plurality of phosphor pieces.

8. The lighting device according to claim 1, wherein a surface of the reflective region protrudes with respect to a surface of the phosphor.

9. The lighting device according to claim 1, wherein the reflective layer includes a plurality of reflective portions, and the reflective region is between the plurality of reflective portions.

10. The lighting device according to claim 9, wherein the reflective region is in direct contact with the plurality of reflective portions.

11. The lighting device according to claim 3, wherein a reflective surface of the reflective region configured to receive the excitation light has an uneven shape.

12. The lighting device according to claim 3, wherein the reflective region includes a reflective surface configured to receive the excitation light, the plurality of phosphor pieces include phosphor surfaces configured to receive the excitation light, and when an area change rate of an effective range of the excitation light received by the phosphor is 20% or less, a change rate of an area ratio of the reflective surface to the phosphor surfaces in the effective range is a half or less of the area change rate.

13. The lighting device according to claim 3, wherein the reflective region is in direct contact with the spreader, the reflective layer, and the plurality of phosphor pieces.

14. The lighting device according to claim 3, wherein a surface roughness of the reflective region is larger than a surface roughness of the plurality of phosphor pieces.

15. The lighting device according to claim 3, wherein a surface of the reflective region protrudes with respect to a surface of the phosphor.

16. The lighting device according to claim 3, wherein the reflective layer includes a plurality of reflective portions, and the reflective region is between the plurality of reflective portions.

17. The lighting device according to claim 16, wherein the reflective region is in direct contact with the plurality of reflective portions.

* * * * *

UNITED STATES PATENT AND TRADEMARK OFFICE
CERTIFICATE OF CORRECTION

PATENT NO. : 10,969,671 B2  
APPLICATION NO. : 16/699302  
DATED : April 6, 2021  
INVENTOR(S) : Yamagishi et al.

Page 1 of 1

It is certified that error appears in the above-identified patent and that said Letters Patent is hereby corrected as shown below:

On the Title Page

Item [30], insert:  
--Oct. 31, 2017 (JP)......................2017-210680  
Jul. 27, 2018 (JP)......................2018-140792--.

Signed and Sealed this  
Tenth Day of August, 2021

Drew Hirshfeld  
*Performing the Functions and Duties of the  
Under Secretary of Commerce for Intellectual Property and  
Director of the United States Patent and Trademark Office*